United States Patent [19]

Uchida et al.

[11] Patent Number: 4,479,085
[45] Date of Patent: Oct. 23, 1984

[54] POWER SOURCE CIRCUIT

[75] Inventors: Seiya Uchida, Akishima; koichi Ashikaga, Tokyo, both of Japan

[73] Assignee: Iwasaki Tsushinki Kabushiki Kaisha, Tokyo, Japan

[21] Appl. No.: 329,029

[22] Filed: Dec. 9, 1981

[30] Foreign Application Priority Data

Dec. 19, 1980 [JP] Japan .............................. 55-178905

[51] Int. Cl.³ .............................................. G05F 1/56
[52] U.S. Cl. ................................................... 323/280
[58] Field of Search ........................ 323/273, 280, 281

[56] References Cited

U.S. PATENT DOCUMENTS

| | | | |
|---|---|---|---|
| 3,470,457 | 9/1969 | Howlett | 323/280 |
| 3,555,402 | 1/1971 | Bozarth et al. | 323/280 |
| 4,206,397 | 6/1980 | Dahlke | 323/273 |

OTHER PUBLICATIONS

Bernstein, "Adjustable Active Load Maintains Constant DC Power Dissipation", Electronics, Nov. 13, 1975, p. 140.

Primary Examiner—William M. Shoop
Assistant Examiner—Jeffrey Sterrett
Attorney, Agent, or Firm—Robert E. Burns; Emmanuel J. Lobato; Bruce L. Adams

[57] ABSTRACT

A power source circuit having a reference voltage generating circuit for generating a DC reference voltage a current output circuit provides across output lines a current proportional to an input voltage, and an error voltage integration circuit is provided for integrating a voltage proportional to a difference between the DC reference voltage and the voltage across the output lines at a required integration time constant to apply the integrated output as the input voltage to a current output circuit. The integration time constant is set so that an output terminal connected to the output lines may have a low output impedance in terms of direct current to maintain a predetermined constant DC output voltage and have a high output impedance with respect to an AC signal applied to the output lines.

1 Claim, 5 Drawing Figures

Fig. 4a
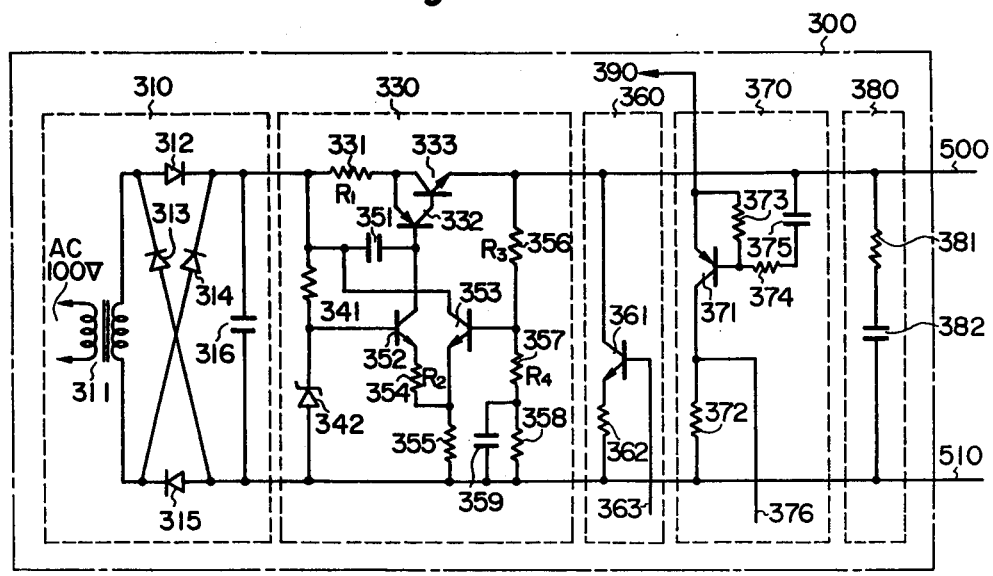
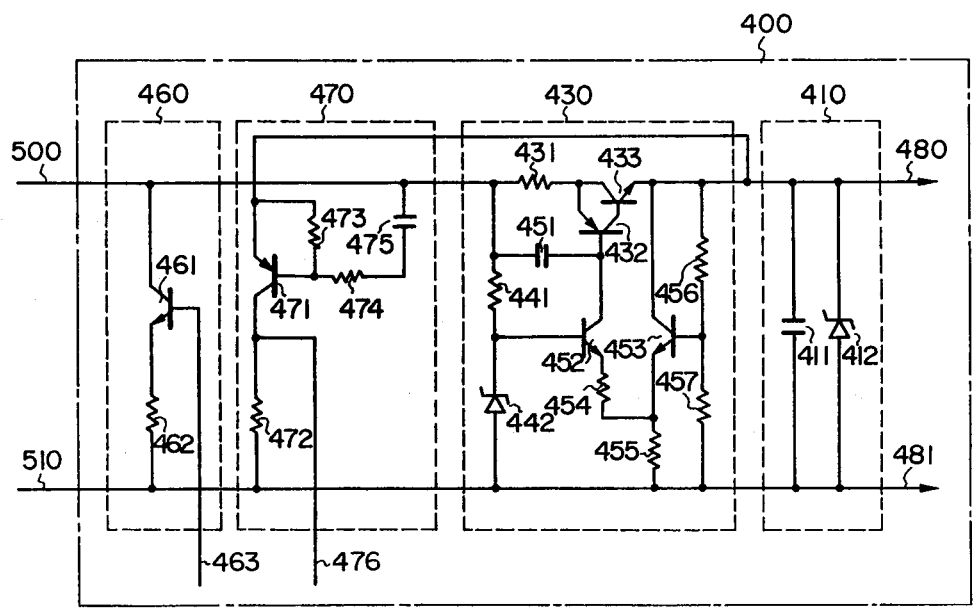
Fig. 4b

POWER SOURCE CIRCUIT

BACKGROUND OF THE INVENTION

The present invention relates to a power source circuit, and more particularly to a power source circuit constructed through utilization of a semiconductor element to maintain a constant DC voltage and to have a high AC output impedance so that an AC signal may be superimposed on the output line of the power source.

A conventional power source circuit of the type which comprises a choke coil having a DC resistance, has a defect such that the DC voltage across the output lines fluctuates with the value of the DC current flowing therethrough.

BRIEF SUMMARY OF THE INVENTION

An object of the present invention is to provide a power source circuit using a semiconductor element instead of a choke coil, thereby decreasing the DC output impedance of the power source circuit, maintaining the DC output at a desired constant value independent of fluctuations of a load and increasing the AC output impedance to permit superposing of an AC signal on the output lines.

To attain the above object of the present invention, there is provided a power source circuit comprising: input lines for receiving a DC input current; reference voltage generating means for generating a DC reference voltage; output lines for applying a DC output current to a load; current output means operatively inserted between the input lines and the output lines for providing at the output lines output current proportional to an input voltage; and error voltage integration means are operatively connected to the reference voltage generating means and the current output means for integrating a voltage proportional to a difference between the DC reference voltage and a voltage of the output lines at a required integration time constant to produce an integrated output applied as the input voltage to the current output means. The required integration time constant is determined so that the output lines have a low output impedance in terms of direct current to maintain across the load a predetermined constant DC output voltage and a high output impedance with respect to an AC signal provided thereon.

BRIEF DESCRIPTION OF THE DRAWINGS

The invention will be described in detail below in comparison with conventional circuits with reference to the accompanying drawings, in which:

FIGS. 4a and 4b are a circuit diagram showing an example of an application of the present invention.

DETAILED DESCRIPTION

To make a difference between the present invention and conventional arts clear, an example of a conventional circuit will first be described.

Figure 1:
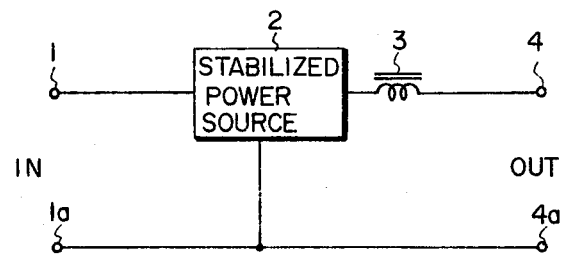
FIG. 1 is a circuit diagram showing a conventional power source circuit.

A conventional power source circuit of this kind has a construction such as shown in FIG. 1. In FIG. 1 reference numeral 1 indicates an input line for an astable input; 2 indentifies a DC stabilized power source; 3 indicates a choke coil 3; 4 designates an output line. Since the conventional DC stabilized power source 2 has low DC and AC output impedances, the choke coil 3 is inserted in its output to raise the AC output impedance across the output line 4, thereby suppressing attenuation of an AC signal which is superimposed on the output line 4. Accordingly, it is necessary that the choke coil 3 is not magnetically saturated by a DC current and is low in DC resistance and large in inductance (several hundres mH to several H), and the choke coil 3 which satisfies these requirements has a defect of bulkiness. Furthermore, since the choke coil 3 has a DC resistance, there is a drawback such that the DC mean voltage of the output line 4 varies with the DC current flowing therein.

With reference to the accompanying drawings, the present invention will hereinafter be described in detail.

Figure 2:
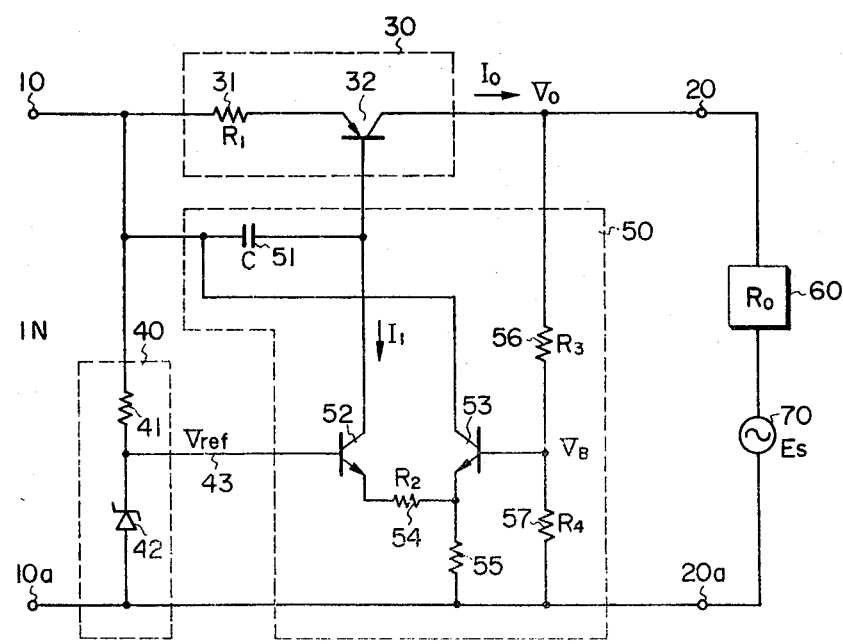
FIG. 2 is a circuit diagram illustrating an embodiment of the present invention.

FIG. 2 illustrates an embodiment of a power source according to the present invention. Reference numerals 10 and 10a indicate input lines of the power source circuit; 20 and 20a designate its output lines; 30 identifies a current output circuit; 31 denotes a resistor; 32 represents a transistor; 40 shows a reference voltage generating circuit; 41 refers to a resistance; 42 indicates a Zener diode; 43 designates a reference voltage output line; 50 identifies an error voltage integration circuit; 51 denotes a capacitor for integration; 52 and 53 represent transistors; 54, 55, 56 and 57 shows resistors; 60 refers to a load connected across the output lines 20 and 20a; and 70 indicates a signal source on the side of the load.

A description will be given of the operation of the power source circuit shown in FIG. 2. In a case where the load 60 undergoes no fluctuations and the voltage $E_s$ of the signal source 70 is always zero, the current output circuit 30 and the error voltage integration circuit 50 constitute a DC feedback amplification circuit, which performs the same operation as an ordinary DC stabilized power source, providing across the output lines 20, 20a a constant DC voltage $E_0$ which does not depend on the value $R_0$ of the load 60.

This will hereunder be described in detail.

Now, let a DC voltage desired to be provide across the output lines 20 and 20a and the value of a DC output voltage actually provided across the output lines 20 and 20a be represented by $E_0$ and $V_0$, respectively. An astable input applied across the input lines 10 and 10a passes through the resistor 41 and is stabilized by the Zener diode 42, providing a fixed DC voltage on the output line 43.

Let the ratio of the DC voltage $V_{ref}$ to the aforesaid DC voltage $E_0$ be represented by $\alpha$ ($\alpha = V_{ref}/E_0$) and the values of the resistors 56 and 57 be represented by $R_3$ and $R_4$, respectively. By setting the resistance values $R_3$ and $R_4$ so that $$\alpha = R_4/(R_3+R_4)$$

and so that a current flowing in the resistors 56 and 57 may be sufficiently larger than the base current of the transistor 53 and sufficiently smaller than a current flowing in the load 60, a voltage $V_B$ applied to the base of the transistor 53 assumes a value obtained by dividing the output voltage $V_0$ on the output line 20 by the resistors 56 and 57; namely, $V_B = \alpha V_0$.

Assuming that respective voltage drops in the base-emitter paths of the transistors 52 and 53 are equal to each other, a voltage which is applied across the resistor 54 is equal to a difference $(V_{ref}-V_B)$ between the voltages which are applied to the respective bases of the transistors 52 and 53. Accordingly, letting the value of the resistor 54 be represented by $R_2$, a current flowing in the resistor 54 becomes $$(V_{ref}-V_B)/R_2 = \alpha(E_0-V_0)/R_2$$

and this current is substantially equal to a collector current $I_1$ of the transistor 52.

Therefore, it follows that $$I_1 = \alpha(E_0-V_0)/R_2$$

On the aforesaid assumption, the output voltage $V_0$ across the output lines 20 and 20a is a constant DC current, so that the abovesaid collector current $I_1$ becomes a DC current and does not flow in the capacitor 51 but all becomes a base current of the transistor 32.

Accordingly, letting the common-emitter current amplification factor of the transistor 32 and its collector current be represented by $\beta$ and $I_0$, respectively, $$I_0 = \beta I_1 = \beta\alpha(E_0-V_0)/R_2$$

and letting the value of the load 60 be represented by $R_0$, $$V_0 = I_0 R_0$$

After all, it follows that $$V_0 = R_0 \beta \alpha (E_0 - V_0)/R_2$$

Consequently, $$V_0 = \frac{1}{1+\frac{R_2}{\beta \alpha R_0}} E_0$$

If $\beta$ is sufficiently larger than $R_2/(\alpha R_0)$, then it follows that $$V_0 = E_0$$

regardless of the value $R_0$ of the load 60 and the voltage $V_0$ across the output lines 20 and 20a becomes the desired DC voltage $E_0$.

The astable input applied across the input lines 10 and 10a includes an AC component such as ripples, but this AC component does not appear across the output lines 20 and 20a. This will hereinbelow be described. In order for the AC component to appear across the output lines 20 and 20a, it is necessary that the AC component be included in the collector current of the transistor 32. As the collector current of the transistor 32 is controlled in proportion to its base current, it is necessary that the AC component be included in the base current of the transistor 32. In a case where the AC component becomes the base current of the transistor 32, there are two routes [input line 10→resistor 31→the emitter of transistor 32→the base of transistor 32→capacitor 51→input line 101] and [input line 10→resistor 31→the emitter of transistor 32→the base of the transistor 32→the collector of transistor 52→the emitter of the transistor 52→resistor 54→resistor 55→input line 10a]. Since the former does not form a loop with respect to the voltage across the input lines 10 and 10a, the AC component does not flow via the former route. In general, as the collector resistance of a transistor is very high, the AC component does not flow via the latter route to the collector of the transistor 52. Accordingly, the AC component is not included in the base current of the transistor 32 and, after all, the AC component applied across the input lines 10 and 10a does not occur across the output lines 20 and 20a but only the aforementioned DC voltage $E_0$ occurs thereacross.

Next, a description will be given in connection with a case where the voltage $E_s$ of the signal source 70 at the side of the load is not zero.

At first, the operation will be described qualitatively. Assuming that the output voltage $V_0$ across the output lines 20 and 20a is decreased by the signal source 70, the base voltage $V_B$ of the transistor 53 decreases. On the other hand, the base voltage of the transistor 52 is the constant reference voltage $V_{ref}$, so that if voltage drops in the base-emitter paths of the transistors 52 and 53 are equal to each other, then the voltage across the resistor 54 becomes $V_{ref}-V_B$ and the current flowing in the resistor 54 increases. At this time, since the collector current of the transistor 52 is nearly equal to the current flowing in the resistor 54, the former comes to increase but this increased current almost flows in the capacitor 51 and does not lead to an increase in the base current of the transistor 32. Accordingly, the collector current of the transistor 32 does not increase, and consequently the output voltage $V_0$ across the output lines 20 and 20a remains to be decreased. Also in a case where the output voltage $V_0$ across the output lines 20 and 20a is increased by the signal source 70, a voltage corresponding to the voltage of the signal source 70 appears across the output lines 20 and 20a.

Next, the operation will quantitatively be described in detail.

Let the signal source 70 be represented by $$V_S = V_s e^{j\omega t}$$

where $\omega = 2\pi f$.

Assuming that the output voltage $V_0$ across the output lines 20 and 20a, the collector current $I_1$ of the transistor 52 and the collector $I_0$ of the transistor 32 are rendered $V_0'$, $I_1'$ and $I_0'$, respectively, by the signal source 70, and that $$V_0' = V_0 + V_0 e^{j\omega t}$$

collector current $I_1'$ of the transistor 52 becomes $$I_1' = \alpha(E_0-V_0')/R_2 = \alpha(E_0-V_0-V_0 e^{j\omega t})/R_2$$

as is the case with the foregoing.

In the foregoing, since $V_0 = E_0$, it follows that $$I_1' = -\frac{\alpha}{R_2} V_0 e^{j\omega t}$$

Now, assuming that the common-emitter current amplification factor of the transistor 32 is sufficiently large and that the collector current $I_1'$ of the transistor 52 does not become the base current of the transistor 32 but flows in the capacitor 51, and letting a terminal voltage of the capacitor 51 based on the abovesaid collector current $I_1'$ be represented by $v_c$ and the capacity of the capacitor 51 be represented by $C$, it follows that $$v_c = \frac{1}{C} \int I_1' dt = -\frac{\alpha}{j\omega CR_2} v_0 e^{j\omega t}$$

Accordingly, the collector current $i_0$ of the transistor 32 based on the abovesaid terminal voltage $v_c$ is equal to the emitter current of the transistor 32 and becomes as follows:

$$i_0 = \frac{v_c}{R_1} = -\frac{\alpha}{j\omega CR_2 R_1} v_0 e^{j\omega t}$$

On the other hand, $$I_0' = I_0 + i_0 = \frac{V_0' - V_S}{R_0} = \frac{V_0 + V_0 e^{j\omega t} - v_s e^{j\omega t}}{R_0}$$

$$= \frac{V_0 + (v_0 - v_s)e^{j\omega t}}{R_0}$$

Accordingly, since $$i_0 = \frac{v_0 - v_s}{R_0} e^{j\omega t}$$

it follows from the aforesaid $i_0$ that $$-\frac{\alpha}{j\omega CR_2 R_1} \cdot v_0 = \frac{v_0 - v_s}{R_0}$$

Therefore, $$v_0 = \frac{1}{1 + \frac{\alpha R_0}{j\omega CR_2 R_1}} v_s$$

Accordingly, it is seen from the above that if the angular frequency $\omega$ of the signal source 70 is large to some extent, then $v_0$ is nearly equal to $v_s$, and that the voltage of the signal source 70 occurs in the vicinity of the DC voltage $V_0 (=E_0)$ on the output line 20. In other words, the time constant of the error voltage integration circuit is set so that the signal of the signal source 70 may be generated at a value larger than a desired one.

As will be appreciated from the foregoing description, the power source circuit of the present invention is arranged to be low in its DC output impedance to maintain a constant desired DC voltage value independent of a load and to provide a high output impedance with respect to a desired AC signal so that the AC signal may be superimposed on the output line.

In FIG. 2, if the transistor 32 of the current output circuit 30 is replaced by a transistor circuit of the Darlington connection, the common-emitter current amplification factor becomes large, so that the value of the collector current of the transistor 52 flowing in the capacitor 51 increases and the operation of the error voltage integration circuit 50 becomes close to an ideal one. In a case where the input applied across the input lines 10 and 10a is an already stabilized DC voltage, the reference voltage generating circuit 40 can be formed by a circuit in which the Zener diode is substituted by a mere resistor.

Figure 3:
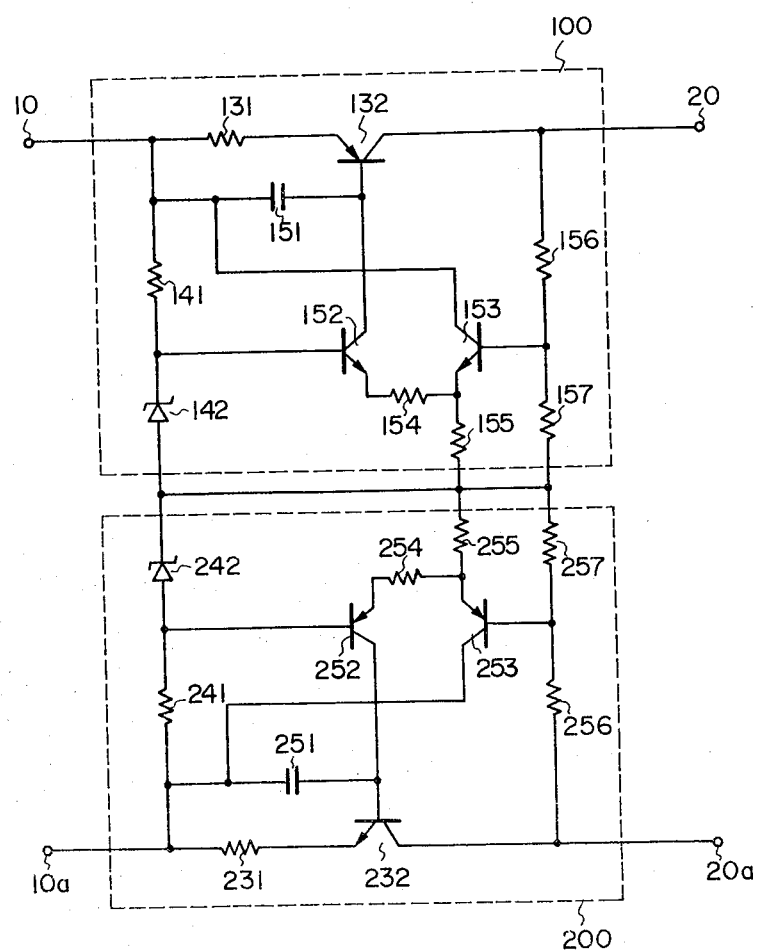
FIG. 3 is a circuit diagram illustrating another embodiment of the present invention.

FIG. 3 illustrates an embodiment of the power source circuit of the present invention which is constructed as a balanced type one. In FIG. 3, reference numerals 10 and 10a indicate input lines of the power source circuit; 20 and 20a designate output lines of the power source circuit; 100 identifies a positive power source circuit; 200 denotes a negative power source circuit; 131, 141, 154, 155, 156, 157, 231, 241, 254, 255, 256 and 257 represent resistors; 151 and 251 show capacitors; 142 and 242 refer to Zener diodes; and 152, 153, 252 and 253 indicate transistors. The power source circuit 100 is identical with that shown in FIG. 1 and the power source circuit 200 is one that the transistors in FIG. 1 are all replaced by backward transistors. The operation of the power source circuit 100 is identical with that of the power source circuit of FIG. 1 and the operation of the power source circuit 200 is also identical with that of the power source circuit of FIG. 1 except that the directions of currents are reverse to those in the latter; therefore, no description will be given of the operations of the power source circuits shown in FIG. 3.

FIGS. 4a and 4b illustrates an embodiment of the present invention applied to power source units of a key service unit and a key telephone set in an electronic key telephone system, in which power supply and data transmission are performed via a pair of cables. In FIG. 4a, reference numeral 300 indicates a power source unit of the key service unit; reference numeral 400 designates a power source unit of the key telephone set; reference numerals 500 and 510 identify power lines. In the power source unit 300, reference numeral 310 denotes a rectifier circuit; 311 represents a power transformer; 312, 313, 314, and 315 show diodes; 316 refers to a capacitor; 330 indicates a power source circuit according to the present invention; 331, 341, 354, 356, 357 and 358 designate resistors; 351 and 359 identify capacitors; 342 denotes a Zener diode; 332, 333, 352 and 353 represent transistors; 360 shows a transmitting circuit; 361 refers to a transistor; 362 indicates a resistor; 370 designates a receiving circuit; 371 identifies a transistor; 372, 373 and 374 denote resistors; 375 represents a capacitor; 380 shows a terminating circuit; 381 refers to a resistor; 382 indicates a capacitor; 363 designates a data input line; and 376 identifies a data output line.

In the power source unit 400, reference numeral 460 denotes a transmitting circuit; 461 represents a transistor; 462 shows a resistor; 470 refers to a receiving circuit; 471 indicates a transistor; 472, 473 and 474 designate resistors; 475 identifies a capacitor; 430 denotes a power source circuit according to the present invention; 431, 441, 454, 455, 456 and 457 represent resistors; 451 shows a capacitor; 442 refers to a Zener diode; 432, 433, 452 and 453 indicate transistors; 463 designates a data input line; 476 identifies a data output line; 410 denotes a load fluctuation absorbing circuit; 411 represents a capacitor; 412 shows a Zener diode; and 480 and 481 refer to power source lines for other circuits of the key telephone set.

Next, a description will be given first, with reference to FIG. 4, of a power supply operation.

The power source circuit 330 is constituted as a circuit of the Darlington connection by substituting the resistor 57 in FIG. 2 by the resistors 357 and 358 and the capacitor 359 and, further, the transistor 32 by the transistors 332 and 333. Letting the ratio of the voltage applied to the base of the transistor 353 to the voltages of the feeders 500 and 510 be represented by $\alpha$, this is the same as that $\alpha$ mentioned previously in respect of FIG. 2. In FIG. 4, if the value of the capacitor 359 is set to be sufficiently large, $\alpha$ is a dividing ratio $\alpha_{DC}$ of the resistor 356 and a composite series resistance of the resistors 357 and 358 in terms of DC but, in terms of AC, the resistor 358 is bipassed by the capacitor 359, so that it becomes a dividing ratio $\alpha_{AC}$ of the resistors 356 and 357 and $\alpha_{AC}$ becomes smaller than $\alpha_{DC}$. Accordingly, if the $\alpha$ used for the description of FIG. 2 is replaced by $\alpha_{DC}$ in terms of DC and $\alpha_{AC}$ in terms of AC, the operation of the power source circuit 330 is identical with the operation described previously with regard to FIG. 2. Since $\alpha_{AC}$ can be set by the resistors 356 and 357 to an arbitrary value smaller than one and is smaller than $\alpha_{DC}$, the power source circuit 330 provides the same results as those obtainable with the power source circuit of FIG. 2 in terms of AC even if the value of the capacitor 351 is smaller than that of the capacitor 51 in FIG. 2.

Next, in the rectifier circuit 310, the commercial power source passes through the transformer 311 and is subjected to full-wave rectification by a bridge circuit which is formed by the diodes 312 to 315 and the rectified output is smoothed by the capacitor 316 to provide an output including ripples for input to the power source circuit 330. The output from the power source circuit 330 is a ripple-free DC current which is determined by the aforesaid $\alpha_{DC}$ and the Zener diode 342, and this output is supplied via the power line 500 and 510 to the power source unit 400 of the key telephone set.

In the power source unit 400, the power source circuit 430 is formed as a circuit of the Darlington connection by replacing the transistor 32 in the power source circuit of FIG. 2 by the transistors 432 and 433. In FIG. 4, the connection of the collector of the transistor 353 differs from that of the collector of the transistor 53 in FIG. 2 but it is intended to prevent that a change in the collector current of the transistor 353 appears on the power lines 500 and 510 and the operation in this case is exactly the same as in the case of FIG. 2. Accordingly, the power source circuit 430 is supplied with power via the power lines 500 and 510 to provide across the power source lines 480 and 481 a constant DC voltage which is determined by the Zener diode 442 and the resistor 456 and 457.

Further, as described previously in respect of the power source circuit of FIG. 2, the output impedance of the power source circuit 430 is high, so that a fluctuation in the load connected across the power source lines 480 and 481 causes a fluctuation in the voltage across the power source lines 480 and 481 but this fluctuation is suppressed by the load fluctuation absorbing circuit 410. When the load becomes larger, the capacitor 411 supplies power and when the load becomes smaller, the capacitor 411 is charged; namely, this capacitor serves to prevent that the voltage across the power source lines 480 and 481 is varied by a rapid fluctuation in the load. Therefore, the larger the capacity of the capacitor is, the less the voltage fluctuation across the power source lines 480 and 481 is. In a case where the load fluctuation is large and cannot sufficiently be absorbed by the capacitor 411 and the load becomes smaller abruptly, the voltage across the power source lines 480 and 481 may sometimes rise to render conductive the transistor 433 at its emitter-collector path but this is prevented by the use of the Zener diode 412 the Zener voltage of which is selected to be slightly higher than a predetermined DC voltage. In the power source circuit 430, as is the case with the power source circuit 330 described previously, even if an AC component exists across the power lines 500 and 510, it is not applied across the power source lines 480 and 481, so that it flows in the power source circuit 430 via a route [resistor 411→Zener diode 442] alone. Accordingly, the impedance of the power source circuit 430 as viewed from the power lines 500 and 510 assumes the value of the resistor 441.

Next, the operation of data transmission will be described on the assumption of the power supply operation described above.

At first, by selecting the values of the resistors 374 and 474 in the data receiving circuits 370 and 470 to be sufficiently large (for example, 10 k$\Omega$) and the value of the resistor 441 in the power source circuit 430 to be sufficiently large (for example, 10 k$\Omega$), the load impedance connected across the power lines 500 and 510 takes a sufficiently large value (several k$\Omega$) but this does not match with an impedance of several hundreds of ohms in a case where the power lines 500 and 510 are regarded as transmission lines. Accordingly, if the resistor 381 in the terminating circuit 380 is set to a value of several hundreds of ohms and if the capacitor 382 is set to a sufficiently large value (for example tens of $\mu$F), then the power lines 500 and 510 are terminated with the resistor 381 with respect to signals more than several hundreds of Hz.

In a case of transmitting data from the key service unit to the key telephone set in the above state, when a signal voltage is applied to the data input line 363, the transistor 361 operates in its active region and a signal current proportional to the applied signal voltage flows to the collector of the transistor 361, providing across the power lines 500 and 510 a signal voltage having a value of the product of the abovesaid signal current and the terminating impedance of the terminating circuit 380. The signal voltage thus produced across the power lines 500 and 510 is supplied via the capacitor 475 and the resistor 474 to the transistor 471 to turn it ON in the receiving circuit 470, providing a signal on the data output line 476. Similarly, in a case of transmitting data from the key telephone set to the key service unit, when a signal voltage is applied to the data input line 463, a signal is provided on the data output line 376.

Next, a description will be given of the relationship between the signal transmission rate and the integration time constant of the power source circuit 330.

Let the value of the resistor 381 in the terminating circuit 380 be represented by $R_0$ and the values of the resistors 331, 354, 356 and 357 in the power source circuit 330 be represented by $R_1$, $R_2$, $R_3$ and $R_4$, respectively, and the value of the capacitor 351 be represented by C. Assume that signal currents flowing to the collectors of the transistors 361 and 461 in the transmitting circuits 360 and 460 are of the same value $i_s$ (an angular frequency $\omega$). Setting $$v_s = R_0 i_s$$

$$\alpha = \frac{R_4}{R_3 + R_4}$$

a signal current $v_0$ appearing across the power lines 500 and 510 is given by $$v_0 = \frac{1}{1 + \frac{\alpha R_0}{j\omega C R_2 R_1}} v_s$$

as is the case with FIG. 2. However, the threshold voltage in the base-emitter path of each of the trasistors 371 and 471 is about 0.7 V, so that, assuming that $v_s=2$ V, even if $v_0$ is attenuated 10% or so as compared with $v_s$, the receiving circuit 360 is capable of performing its normal receiving operation, and hence there is no trouble in practical use. In this case, $$\frac{\alpha R_0}{\omega C R_2 R_1} = 0.1,$$

therefore, if it is assumed that the frequency of the signal is 1 kHz, $R_0=200\Omega$, $R_1=1\Omega$, $R_2=1$ k$\Omega$, $R_3=5$ k$\Omega$ and $R_4=500\Omega$, then $c \approx 29$ $\mu$F.

The integration time constant of the power source circuit 430 is set so that the receiving circuits 370 and 470 may not erroneously respond to noise which is developed across the power lines 500 and 510 by a fluctuation in the load connected across the power source lines 470 and 471. Though not described in detail, this value depends on the value of fluctuation and the fluctuated frequency of the load, the value of the capacitor 411, the terminal impedance of the terminating circuit 380 and the time constant determined by the resistors 373 and 374 and the capacitor 375 of the receiving circuit 370 and the time constant determined by the resistors 473 and 474 and the capacitor 475 of the receiving circuit 380. For example, assuming that the load connected across the power source lines 480 and 481 is a relay load intermitting at intervals of several seconds the passage therethrough of a current of 30 mA, that the resistors 373 and 374 and the capacitor 375 of the receiving circuit 370 have values of 50 k$\Omega$, 10 k$\Omega$ and 0.033 $\mu$F, respectively, that the resistor 381 of the terminating circuit 380 has a value of 200$\Omega$, and that the capacitor of the load variation absorbing circuit 410 has a value of 1000 $\mu$F, it is sufficient that the values of the respective elements of the power source circuits 430, that is, the resistor 431, the capacitor 451, the resistor 454 and the resistors 456 and 457 are 10$\Omega$, 200 $\mu$F, 1 k$\Omega$ and about 5 k$\Omega$, respectively.

Although in the foregoing a key telephone set is connected across the power lines 500 and 510, it is also possible to connect a plurality of key telephone sets across the power lines 500 and 510. In this case, the plurality of key telephone sets are connected via a pair of power lines through utilization of a multi-drop branching system and the data transmission also employs the multi-drop system.

While in the foregoing the error voltage integration circuit and the current output circuit employ transistors, it is also possible to use integrated operational amplifiers or the like.

As has been described in the foregoing, according to the present invention, in a system (for example, an electronic key telephone system) which performs a DC supply through a pair of cables by superimposing a DC current and an AC signal thereon and also performs data transmission, there is no need of using an expensive DC stabilized power source and a choke coil; accordingly, the present invention greatly contributes to making equipment small and inexpensive.

What we claim is:

1. A power source circuit comprising:
input lines for receiving a DC input current;
reference voltage generating means provided across said input lines for generating a DC reference voltage;
output lines for applying a DC output current to a load;
current output means operatively connected between one of said input lines and one of said output lines and comprising a first transistor circuit having a control input terminal and a current path including a first resistor for providing at said output lines said DC output current in response to said DC input current; and
error voltage integration means comprising a second transistor circuit for receiving a breeder voltage of a voltage across said output lines, a third transistor circuit for receiving said DC reference voltage and defining a differential amplifier together with said second transistor circuit to apply a control current to said control input terminal, a second resistor connected between transistors of the second and third transistor circuits and through which the control current is applied to said control input terminal, and a capacitor connected across said one of the input lines and said control input terminal, said error voltage integration means operating so that a voltage proportional to a difference between said DC reference voltage and said breeder voltage at a required integration time constant operates to develop said control current, said required integration time constant being determined by said first resistor, said second resistor and said capacitor so that said output lines have a low output impedance in terms of direct current to maintain across said load a predetermined constant DC output voltage and a high output impedance with respect to an AC signal applied to said output lines.

* * * * *